US009418221B2

(12) United States Patent
Turgeman

(10) Patent No.: US 9,418,221 B2
(45) Date of Patent: *Aug. 16, 2016

(54) METHOD, DEVICE, AND SYSTEM OF DIFFERENTIATING AMONG USERS BASED ON RESPONSES TO INJECTED INTERFERENCES

(71) Applicant: BioCatch Ltd., Tel Aviv (IL)

(72) Inventor: Avi Turgeman, Cambridge, MA (US)

(73) Assignee: BIOCATCH LTD., Tel Aviv (IL)

( * ) Notice: Subject to any disclaimer, the term of this patent is extended or adjusted under 35 U.S.C. 154(b) by 6 days.
This patent is subject to a terminal disclaimer.

(21) Appl. No.: 14/675,768

(22) Filed: Apr. 1, 2015

(65) Prior Publication Data
US 2015/0205955 A1 Jul. 23, 2015

Related U.S. Application Data

(63) Continuation-in-part of application No. 14/566,723, filed on Dec. 11, 2014, which is a continuation of application No. 13/922,271, filed on Jun. 20, 2013, now Pat. No. 8,938,787, which is a continuation-in-part of application No. 13/877,676, filed as application No. PCT/IL2011/000907 on Nov. 29, 2011, application No. 14/675,768, which is a continuation-in-part of application No. 14/320,653, filed on Jul. 1, 2014, application No. 14/675,768, which is a continuation-in-part of application No. 14/320,656, filed on Jul. 1, 2014, application No. 14/675,768, which is a continuation-in-part of application No. 14/325,393, filed on Jul. 8, 2014, application No. 14/675,768, which is a continuation-in-part of application No. 14/325,394, filed on Jul. 8, 2014, application No. 14/675,768, which is a continuation-in-part of (Continued)

(51) Int. Cl.
G06F 21/55 (2013.01)
H04L 29/08 (2006.01)
H04L 29/06 (2006.01)
G06F 3/041 (2006.01)
(Continued)

(52) U.S. Cl.
CPC .............. *G06F 21/552* (2013.01); *G06F 3/041* (2013.01); *G06F 21/31* (2013.01); *G06F 21/316* (2013.01); *G06F 21/32* (2013.01); *G06F 21/554* (2013.01); *H04L 63/08* (2013.01); *H04L 63/1408* (2013.01); *H04L 67/22* (2013.01); *G06F 2221/2133* (2013.01)

(58) Field of Classification Search
CPC ......... H04L 29/06; H04L 29/08; G06F 21/55; G06F 21/552; G06F 3/04892
USPC ........................................................ 709/224
See application file for complete search history.

(56) References Cited

U.S. PATENT DOCUMENTS 4,760,386 A * 7/1988 Heath ....................... G09G 5/08
345/161
7,523,191 B1 * 4/2009 Thomas .............. G06F 11/3438
709/202

(Continued)

*Primary Examiner* — Linglan Edwards
*Assistant Examiner* — William B Jones
(74) *Attorney, Agent, or Firm* — Eitan, Mehulal & Sadot

(57) ABSTRACT

Devices, systems, and methods of detecting user identity, differentiating between users of a computerized service, and detecting a cyber-attacker. An end-user device (a desktop computer, a laptop computer, a smartphone, a tablet, or the like) interacts and communicates with a server of a computerized server (a banking website, an electronic commerce website, or the like). The interactions are monitored, tracked and logged. User Interface (UI) interferences or irregularities are intentionally introduced to the communication session; and the server tracks the response or the reaction of the end-user to such communication interferences. The system determines whether the user is a legitimate human user, or a cyber-attacker or automated script posing as the legitimate human user. The system further detects click-fraud, and prevents or mitigates Application Distributed Denial-of-Service attacks.

19 Claims, 5 Drawing Sheets

Related U.S. Application Data application No. 14/325,395, filed on Jul. 8, 2014, application No. 14/675,768, which is a continuation-in-part of application No. 14/325,396, filed on Jul. 8, 2014, application No. 14/675,768, which is a continuation-in-part of application No. 14/325,397, filed on Jul. 8, 2014, application No. 14/675,768, which is a continuation-in-part of application No. 14/325,398, filed on Jul. 8, 2014.

(60) Provisional application No. 61/973,855, filed on Apr. 2, 2014, provisional application No. 61/417,479, filed on Nov. 29, 2010, provisional application No. 61/843,915, filed on Jul. 9, 2013.

(51) Int. Cl.
*G06F 21/31* (2013.01)
*G06F 21/32* (2013.01)

(56) References Cited

U.S. PATENT DOCUMENTS

| 7,606,915 | B1 * | 10/2009 | Calinov | G06F 21/36 709/229 |
| 2010/0082998 | A1 * | 4/2010 | Kohavi | G06F 21/36 713/182 |

* cited by examiner

METHOD, DEVICE, AND SYSTEM OF DIFFERENTIATING AMONG USERS BASED ON RESPONSES TO INJECTED INTERFERENCES

CROSS-REFERENCE TO RELATED APPLICATIONS

This application claims priority and benefit from U.S. provisional patent application No. 61/973,855, titled "Method, Device, and System of Detecting Identity of a User of an Electronic Service", filed on Apr. 2, 2014, which is hereby incorporated by reference in its entirety.

This application is a Continuation-in-Part (CIP) of, and claims priority and benefit from, U.S. patent application Ser. No. 14/566,723, filed on Dec. 11, 2014; which is a Continuation of U.S. patent application Ser. No. 13/922,271, filed on Jun. 20, 2013, now U.S. Pat. No. 8,938,787; which is a Continuation-in-Part (CIP) of U.S. patent application Ser. No. 13/877,676, filed on Apr. 4, 2013; which is a National Stage of PCT International Application number PCT/IL2011/000907, having an International Filing Date of Nov. 29, 2011; which claims priority and benefit from U.S. provisional patent application No. 61/417,479, filed on Nov. 29, 2010; all of which are hereby incorporated by reference in their entirety.

This application is a Continuation-in-Part (CIP) of, and claims priority and benefit from, U.S. patent application Ser. No. 14/320,653, filed on Jul. 1, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/320,656, filed on Jul. 1, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/325,393, filed on Jul. 8, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/325,394, filed on Jul. 8, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/325,395, filed on Jul. 8, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/325,396, filed on Jul. 8, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/325,397, filed on Jul. 8, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/325,398, filed on Jul. 8, 2014; which claims priority and benefit from U.S. provisional patent application No. 61/843,915, filed on Jul. 9, 2013; all of which are hereby incorporated by reference in their entirety.

FIELD

The present invention is related to the security of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

Some activities may be privileged, or may require authentication of the user in order to ensure that only an authorized user engages in the activity. For example, a user may be required to enter a username and a password in order to access an email account, or in order to access an online banking interface or website.

SUMMARY

The present invention may include, for example, systems, devices, and methods for detecting identity of a user of an electronic device; for determining whether or not an electronic device is being used by a fraudulent user or by a legitimate user; and/or for differentiating among users of a computerized service or among users of an electronic device.

Some embodiments of the present invention may comprise devices, systems, and methods of detecting user identity, differentiating between users of a computerized service, and detecting a possible attacker.

The present invention may provide other and/or additional benefits or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements or components. The figures are listed below.

DETAILED DESCRIPTION OF THE PRESENT INVENTION

Figure 1A:
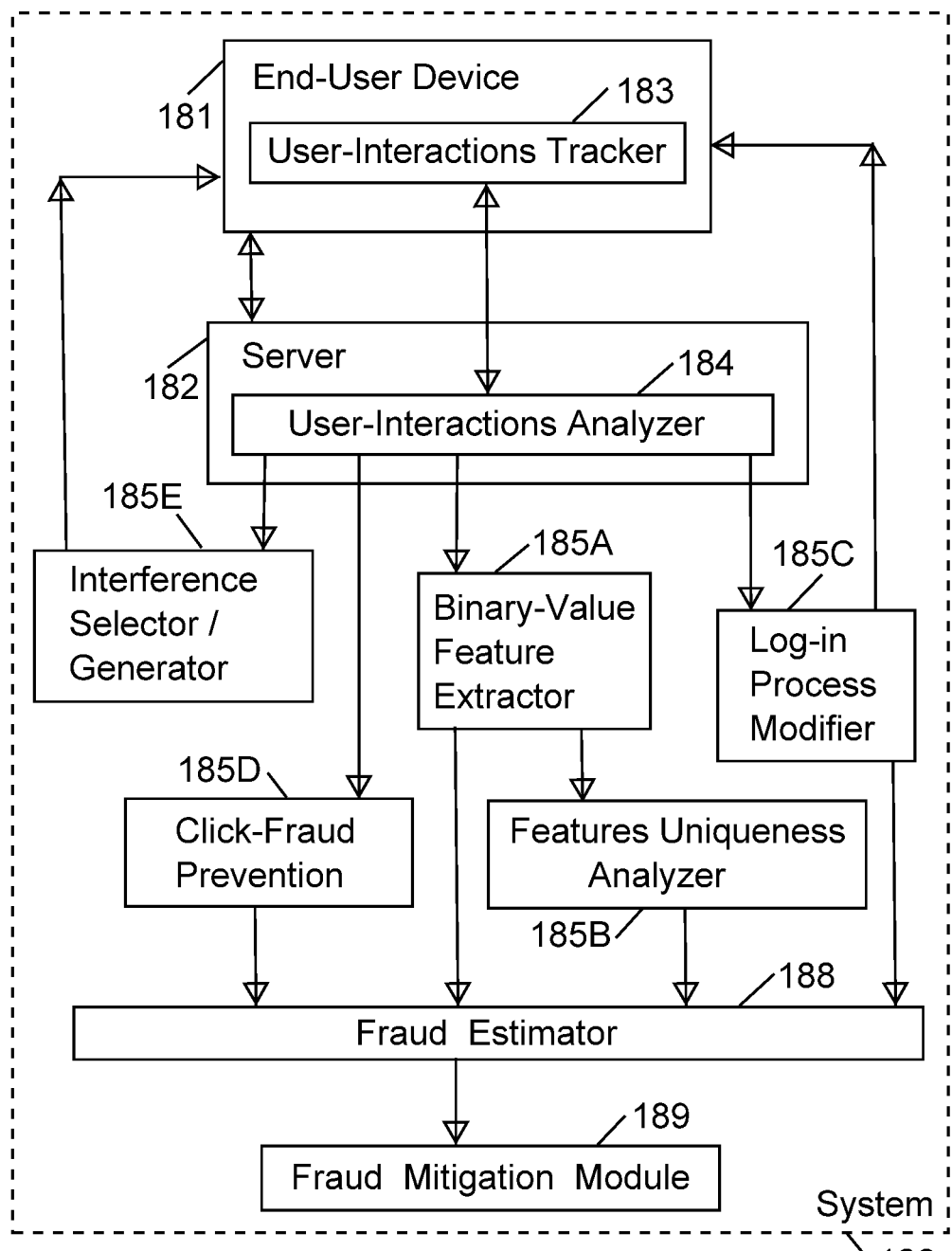
FIG. 1A is a schematic block-diagram illustration of a system, in accordance with some demonstrative embodiments of the present invention.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Applicants have realized that intentional generation and injection of an input/output interference, or abnormality or irregularity in the appearance and/or the operation of a computerized service, may be utilized for differentiating among users, or for differentiating between an authorized legitimate user and a cyber-attacker.

Applicants have further realized that some types of injected abnormalities or injected interferences, may be more useful in order to authenticate a particular user, or should have a greater weight allocated to them as part of a user-authentication scheme. For example, if the response of a particular user to a particular interference, matches the typical response of 90% of the population of users, then this particular interference may not be subsequently used for authenticating this particular user, since the response is not sufficiently unique in the population. In contrast, if the response of a particular user to a particular interference, matches the typical response of 10% of the population of users, then this particular interference may be subsequently used for authenticating this particular user, since the response is sufficiently unique in the population.

Applicants have further realized that some computerized services may be exposed to an Application Distributed Denial-of-Service attack (Application DDoS attack), in which cyber-attacker(s) and/or automated scripts attempt to log-in by entering usernames of actual users, and thereby causing lock-out of legitimate users after several (e.g., three) failed log-in attempts; and thus causing such legitimate users a temporary inability to log-in to the computerized service (e.g., until the legitimate user contacts the service's fraud department or perform other or external authentication procedures). Applicants have realized that injection of communication interferences at, or during, the log-in process to a computerized service, may prevent or may mitigate such Application DDoS attack(s), in a way that causes automatic scripts or cyber-attacker to fail in submitting any user credentials.

Some embodiments of the present invention may operate to automatically distinguish or differentiate, by a machine or by a computer, between: (A) a human user, and (B) a non-human user which may be hostile or non-hostile (e.g., an automated script, a malware, a "bot", a programmed module performing online operations; including, but not limited to, an automated "bot" or user that does not necessarily attacks or hacks a system, for example, an automated script that copies or browses or "grabs" data from a service, or that traverses or downloads data from a computerized service for search-engine purposes or for data-mining purposes, or the like).

In some embodiments of the present invention, an Application DDoS attack may be prevented and/or mitigated, for example, by injecting or introducing an on-screen interference or an input/output interference or anomaly or irregularity, such that the user (e.g., an automated script) would not be able to click on an on-screen "submit" button without manual correction of the input/output interference; thereby preventing from such automated script, or "bot" or Application DDoS attacking unit, from flooding the server of the computerized service with bogus or random "submit" requests or "login" requests or "account creation" requests. In some embodiments, the input/output interference or the anomaly or irregularity, may operate as an invisible CAPTCHA mechanism, which may not allow a machine or an automated script to perform a "submit" or "login" operation (absent manual-correction of input-unit performance, which was interfered by the intentional interference that was injected); and thus preventing or mitigating an Application DDoS attack, or preventing or mitigating machine-performed "login attempts"; while enabling or permitting human-based login-attempts (e.g., by a human user who may visually detect the on-screen anomaly and may then manually perform manual-correction gestures via the input-unit to correct the anomaly and to reach and actuate a "submit" button or a "login" button).

Reference is made to FIG. 1A, which is a schematic block-diagram illustration of a system 180 in accordance with some demonstrative embodiments of the present invention. System 180 may comprise, for example, an end-user device 181 able to communicate with a server 182 of a computerized service. End-user device 181 may comprise a user-interactions tracker 183, for example, implemented as JavaScript code included in (or triggered from) HTML page(s) that are served by server 182 to a Web-browser of end-user device 181. User-interactions tracker 183 may track and log locally all the user inter-actions that are performed via mouse, keyboard, touch-screen, and/or other input unit(s). User-interactions tracker 183 may send or upload the user-interactions data to server 182, where a user-interactions analyzer 184 may analyze and process such data. Multiple modules or sub-modules may operate to deduce or determine or estimate fraud-related or threat-related parameters, based on analysis of the user-inter-actions data. For example, a Binary-Value feature extractor 185A may extract binary-value parameters that are specific to the current user; and a features uniqueness analyzer 185B may determine whether or not the specific response of the current user is sufficiently rare in the population in order to be further used, subsequently, for user authentication purposes. Additionally or alternatively, a log-in process modifier module 185C may modify (or may introduce interferences into) a log-in process (or an account-creation process) of the computerized service, in a manner that fails automatic scripts from submitting user credentials for processing. Additionally or alternatively, a click-fraud prevention module 185D may operate to interfere with the operation of automated scripts that attempt to perform automatic clicks (or selections) on banner ads or other selectable on-screen items. Additionally, an interference selector/generator 185E may select which interferences to introduce to subsequent pages, screens and/or session of that user or of that account. Optionally, a fraud estimator 188 may utilize the outputs or the weighted outputs of these and/or other modules, to estimate an aggregated threat-level or fraud-score associated with the particular user or session or account; and may accordingly trigger a fraud mitigation module 189 to perform one or more fraud mitigation operations.

Figure 1B:
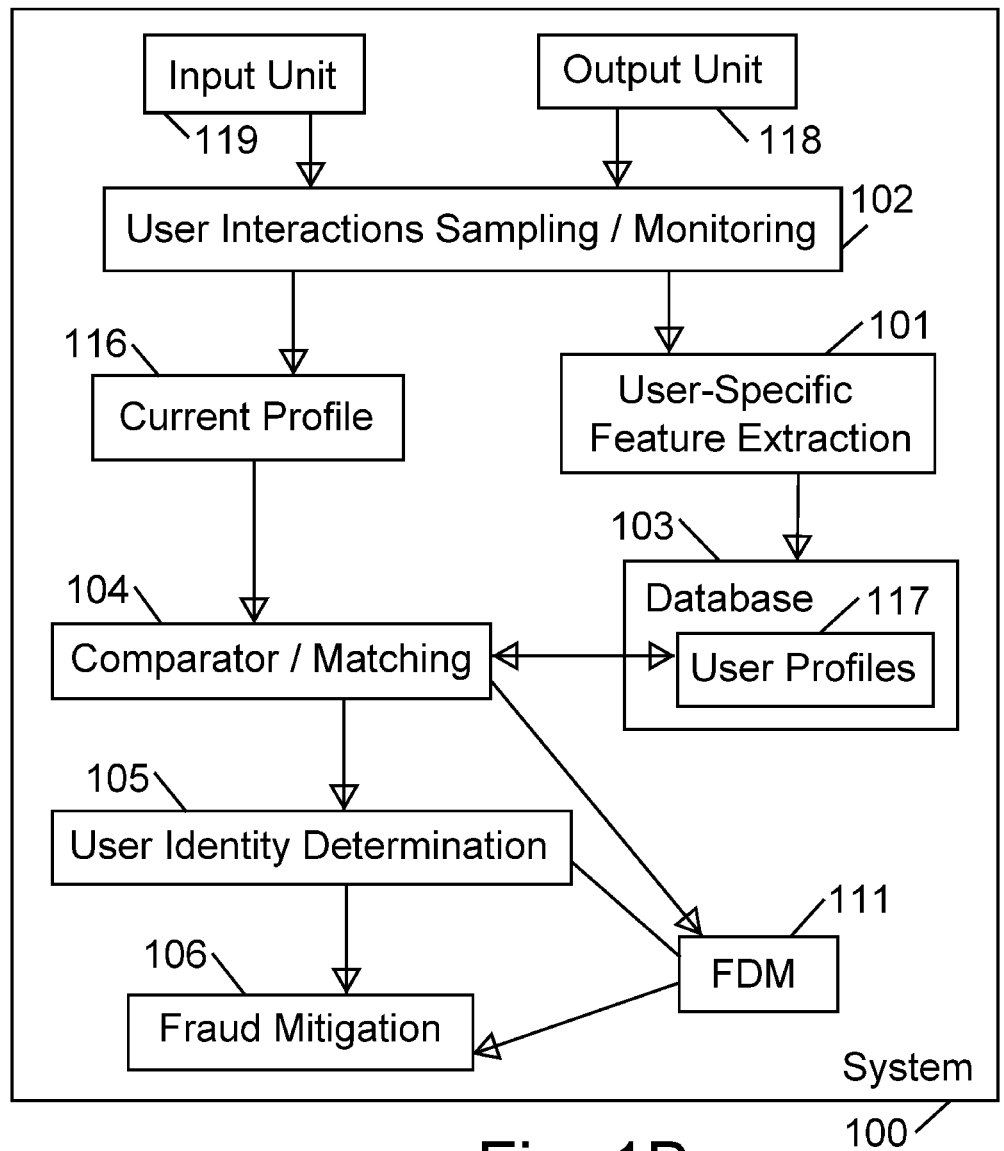
FIG. 1B is a schematic block-diagram illustration of another system, in accordance with some demonstrative embodiments of the present invention.

Reference is made to FIG. 1B, which is a schematic block-diagram illustration of a system 100 in accordance with some demonstrative embodiments of the present invention. System 100 may comprise, for example, an input unit 119, an output unit 118, a user interactions sampling/monitoring module 102, a user-specific feature extraction module 101, a database 103 to store user profiles 117, an ad-hoc or current user profile 116, a comparator/matching module 104, a user identity determination module 105, a Fraud Detection Module (FDM) 111, and a fraud mitigation module 106.

System 100 may monitor interactions of a user with a computerized service, for example, user interactions performed via an input unit 119 (e.g., mouse, keyboard, stylus, touch-screen) and an output unit 118 (e.g., monitor, screen, touch-screen) that the user utilizes for such interactions at the user's computing device (e.g., smartphone, tablet, laptop computer, desktop computer, or other electronic device). For example, a user interactions monitoring/sampling module 102 may monitor all user interactions via the input unit 119 and/or the output unit 118; and may record, log, track, capture, or otherwise sample such user interactions; and/or may otherwise collect user interaction data.

In a demonstrative implementation, for example, an end-user may utilize a computing device or an electronic device in order to launch a Web browser and browse to a website or web-based application of a computerized service (e.g., a banking website, a brokerage website, an online merchant, an electronic commerce website). The web-server of the computerized service may serve code, for example HTML code, that the Web browser of the end-user device may parse and may display and/or execute. In accordance with the present invention, for example, a JavaScript code or code-portion may be served to the Web-browser of the end-user device; or may otherwise be "called from" or loaded from an HTML page that is served to the end-user device. The JavaScript code may operate as a "silent key-logger" module, and may monitor an track and log all the user interactions via keyboard, mouse, touch-screen, and/or other input units, as well as their timing; and may write or upload or send such information to the web-server or to a third-party server in which the user interactions monitoring/sampling module 102 may reside. In some embodiments, such "silent key-logger" may be implemented such that it logs or records or stores or uploads to the server, or analyzes, only anonymous data, or only data that excludes the actual content of user interactions, or only data that on its own does not enable identification of the user or of the content that the use types; e.g., by logging or storing only the data-entry rate or timing, or the key-presses rate or timing, and while not storing (or while discarding) the actual key-presses or content types; for example, logging and storing that the user typed eight characters in two seconds, rather than logging and typing that the user types the word "Jonathan" in two seconds. The data describing the user interactions may be sent or uploaded, for example, every pre-defined time interval (e.g., every second, or every 3 or 5 or 10 seconds), or once a buffer of interactions is filled (e.g., once 20 keystrokes are logged; once 6 mouse-clicks are logged). Other suitable methods may be used to monitor and log user interactions.

The user interaction data may enable a user-specific feature extraction module 101 to extract or estimate or determine or calculate user-specific features that characterize the interaction and which are unique to the user (or, which are probably unique to the user). The user-specific feature extraction module 101 may store in a database 103 multiple user profiles 117, corresponding to various users of the computerized service. A user may have a single stored profile 117; or a user may have multiple stored profiles 117 that correspond to multiple usage sessions of that user (e.g., across multiple days; or across multiple usage sessions that begin with a log-in and end with a log-out or a time-out).

Once a user accesses (or attempts to access) the computerized service, and/or during the access of the user to the computerized service, the user interaction monitoring/sampling module 102 may monitor or sample the current user interactions; and the user-specific feature extraction module 101 may optionally create a current or ad-hoc user profile 116 that characterizes the user-specific features that are currently exhibited in the current session of user interactions.

A comparator/matching module 104 may compare or match, between: (i) values of user-specific features that are extracted in a current user session (or user interaction), and (ii) values of respective previously-captured or previously-extracted user-specific features (of the current user, and/or of other users, and/or of pre-defined sets of values that correspond to known automated scripts or "bots"). In some implementations, the comparator/matching module 104 may compare between the current ad-hoc user profile 116, and one or more previously-stored user profiles 117 that are stored in the database 103.

If the comparator/matching module 104 determines that one or more features, or a set of features, that characterize the current interaction session of the current user, does not match those features as extracted in previous interaction session(s) of that user, then, a possible-fraud signal may be generated and may be sent or transmitted to other modules of the system 100 and/or to particular recipients.

Additionally or alternatively, the comparator/matching module 104 may compare the features characterizing the current session of the current user, to features characterizing known automatic fraudulent mechanisms, known as malware or "bot" mechanisms, or other pre-defined data, in order to determine that, possibly or certainly, the current user is actually a non-genuine user and/or is accessing the service via a fraudulent mechanism.

In some embodiments, the comparator/matching module 104 may comprise, or may operate in association with, a Fraud Detection Module (FDM) 111, which may comprise (or may be implemented as) one or more sub-modules, as described herein.

In some embodiments, the output of the comparator/matching module 104 may be taken into account in combination with other information that the fraud detection module 111 may determine to be relevant or pertinent, for example, security information, user information, meta-data, session data, risk factors, or other indicators (e.g., the IP address of the user; whether or not the user is attempting to perform a high-risk activity such as a wire transfer; whether or not the user is attempting to perform a new type of activity that this user did not perform in the past at all, or did not perform in the past 1 or 3 or 6 or 12 months or other time-period; or the like).

The combined factors and data may be taken into account by a user identity determination module 105, which may determine whether or not the current user is a fraudster or is possibly a fraudster. The user identity determination module 105 may trigger or activate a fraud mitigation module 106 able to perform one or more fraud mitigating steps based on that determination; for example, by requiring the current user to respond to a challenge, to answer security question(s), to contact customer service by phone, to perform a two-step authentication or two-factor authentication, or the like.

System 100 and/or system 180 may be implemented by using suitable hardware components and/or software modules, which may be co-located or may be distributed over multiple locations or multiple devices. Components and/or modules of system 100 and/or system 180 may interact or communicate over one or more wireless communication links, wired communication links, cellular communication, client/server architecture, peer-to-peer architecture, or the like.

Some embodiments of the present invention may generate and/or may utilize a generic interference or generic abnormality to the user interaction, and may utilize an analysis of the user's response to such generic interference in order to differentiate among users, or in order to differentiate between a legitimate (authorized) user and a cyber-attacker, or in order to otherwise determine fraud or possible-fraud or attempted-fraud towards the computerized service.

Some embodiments may operate to prevent, block, identify, mitigate and/or eliminate particular types of cyber-attacks, for example, a Denial of Service (DoS) attack, a Distributed DoS (DDoS) attack, an Application DOS attack, an Application DDOS attack, an attack that utilizes an automated script or "bot" or other malware (e.g., by an external attacker, or by an attacker located inside or within an organization or enterprise or network), or the like. Some embodiments may be utilized for detection, prevention and/or mitigation of click-fraud and other attacks or schemes that may target online advertising or online marketing, for example, an attack that attempts to artificially produce "clicks" on banner ads or ad-links (e.g., in order to increase revenue of a website that publishes the ads; or in order to deflate an advertising budget of a competitor of the attacker). Some embodiments may utilize the methods described herein, as an invisible or user-transparent CAPTCHA mechanism, to differentiate between a human user and an automated computerized script that poses as a human user.

Portions of the discussion herein may relate, for demonstrative purposes, to detection of Application DDOS attacks; however, this is only a demonstrative example of how the present invention may utilize Generic Interferences for fraud detection and/or for user identity authentication; and other attacks may be detected or prevented or mitigated.

In accordance with the present invention, a Generic Interference is an interference or abnormality or irregularity or anomaly that is intentionally introduced or generated or injected by the system into the interface or UI or GUI or output/input that are being used by the user, and which is typically un-noticed or un-sensed by most of the user population due to the weakness or relative insignificance of the interference from the user's point-of-view or from a usability point-of-view. A generic interference may be generated and introduced by the system, for example, to all or to most of the user population of a particular computerized service (e.g., an online banking website), without learning a priori any particular reaction of any particular user, and/or without constructing beforehand any particular user-profile which corresponds to the reaction(s) of a particular user to the introduced interference.

A generic interference may be generated and introduced before the system knows for certain whether or not the user is indeed the legitimate user (e.g., the real account owner), and may allow the system to dynamically identify that a "bot" (e.g., computerized script or program) is trying to access the computerized service, even at an early stage, such as, the log-in stage (e.g., a screen in which a user needs to enter his username and password, or other access credentials).

Generic interference may be or may include, for example: (a) irregular removal or hiding or displacement of the mouse pointer or cursor relative to its current or "normal" or expected on-screen location, and/or creation of a new mouse pointer or cursor at a different on-screen location; (b) introducing a deviation or an offset of the mouse pointer or cursor from an expected mouse-movement route; (c) irregularly modifying the speed of movement of the mouse pointer or cursor during on-screen movement thereof; or the like.

In response to such generic interference, a human user would typically act and correct the deviation or the irregularity (e.g., may actively move the mouse in order to correct or compensate the introduced interference); whereas a "bot" script or computerized program may not act, and may not notice or correct the deviation or interference. As a result, the human user may input a mouse click in a first region (the "correct" region, e.g., exactly within an on-screen "submit" button); whereas a "bot" may input a mouse click in a second, different, region (an "incorrect" region, e.g., near but not within an on-screen "submit" button). The location of the mouse-click input may indicate whether the user is a human user (e.g., who corrected the deviation and clicked in the "correct" region), or is a "bot" or program or script (e.g., which did not notice the deviation, did not correct it, and therefore clicked on the "incorrect" region).

As detailed herein, some implementations of the present invention may utilize a binary-value parameter extractor in order to extract binary parameters, which may allow the system of the present invention to learn more rapidly the user-specific traits or characteristics of the user, and may thus allow the system of the present invention to select (e.g., more rapidly, more effectively, more efficiently) one or more generic interferences that are estimated to be more effective for this particular user, relative to other generic interferences that may exist in a pool or bank of possible interferences.

For example, in some implementations a Binary Parameter may be a parameter based on one or more measurements, such that each measurement generates exactly one value out of exactly two possible values ("0" or "1"; or, "true" or "false"), and such that each measurement is directed at determining one out of two possible behavioral characteristics of the user being measured.

In a demonstrative example, the Applicants have realized that if a generic interference causes the mouse pointer to be hidden, then, some human users typically search for the mouse pointer by rotating the mouse (or mouse-pointer) clockwise (or, right-to-left; or, upwardly); whereas, other human users typically search for the mouse pointer by rotating the mouse (or mouse-pointer) counter-clockwise (or, left-to-right; or, downwardly). The system may extract the value of such generic interference, with regard to a particular user; and may measure the extent to which the same user repeats the same pattern of behavior. The system may further measure how unique (relative to the general population) is the behavioral pattern of the specific user; in other words, estimating how unique the behavioral trait is in relation to the specific user itself and/or in relation to the general population of users (of the particular service, or of all services in general). Accordingly, the more unique the identified behavioral trait is, the more likely would the system utilize this particular behavioral trait as a differentiation parameter between the real user and a fraudulent user.

For example, based on trials and observations, the system of some demonstrative embodiments of the present invention may determine or may estimate that in response to a generic interference of "hiding the mouse pointer", 90 percent of the population of users (e.g., repeatedly, over multiple such events) search for the mouse pointer by moving the mouse (or the hidden mouse-pointer) clockwise; whereas 10 percent of the population of users always (e.g., repeatedly, over multiple such events) search for the mouse pointer by moving the mouse (or the hidden mouse-pointer) counter-clockwise. Based on this specific logical binary parameter, a single measurement may suffice for determining to which group a particular user belongs, and may be used to determine whether or not to continue to generate this specific interference to this specific user.

For example, if the present user is identified as belonging to the group of 90 percent of users that seek the mouse-pointer clockwise, then, the system would determine that this specific interference is not suitable for subsequent utilization with this specific user, since it is not sufficiently unique to this user relative to the entire population. In contrast, if the present user is identified as belonging to the group of 10 percent of users that seek the mouse-pointer counter-clockwise, then the system would determine that this specific interference is suitable for subsequent utilization with this specific user, since it is sufficiently unique to this user relative to the entire population; and this particular binary parameter may be used in subsequent sessions or times (e.g., through such interferences of mouse-pointer hiding) as a relatively efficient, and rapid, indication of whether or not the user is indeed the legitimate user or a fraudster or imposter.

In accordance with the present invention, such utilization of the binary parameter may be rapid and more efficient then for example, measurement of parameter(s) which may have continuous values and/or more-than-two possible values; and which may require a longer learning period and a more complex computation of the statistical significance or relevance for this interference in order to base upon it a determination of legitimate user or fraudulent user. By using this method, the learning period or training period, for determining whether or not to apply this interference to a particular user, may be a single session in which interference was deployed; and the determination whether or not to subsequently utilize this interference, to this particular user, may be reached immediately after such single and first utilization of this interference to with this particular user.

In accordance with some embodiments of the present invention, a generic interference (or a binary interference; or a binary-value interference) may be associated with a set of multiple parameters, such that each of the parameters is a binary parameter which may be measured based on the user's reaction; and each one of such parameters may be utilized as a binary parameter by itself, if the specific user's behavior is unique or is considered relatively-unique (or rare) and repeated, relative to the general population of users. Accordingly, the system may utilize multiple generic interferences, associated with binary-measured parameters, thereby allowing the system to determine, rapidly and/or after a single utilization of each interference to the specific user, which interference(s) to continue to utilize with regard to this particular user, and which other interference(s) to avoid utilizing with regard to this particular user. As a result, in accordance with some demonstrative embodiments of the present invention, each specific user may be exposed, subsequently, to a particular set or particular combination or batch or group or series of such generic interferences that were determined and selected by the system as interferences that trigger (each one by itself) a sufficiently-unique response, relative to the general population.

It is noted that the term "general population" of users (or other similar terms) may include, for example: all the users of all services; or, all the users of a particular type of service (e.g., all the users of banking websites); or, all the users of a particular service (e.g., all the users of a particular banking website, such as, MyBankWebsite.com); or, all the users of a particular section of a particular service (e.g., all the users who perform(ed) a wire transfer via a banking website).

Figure 2:
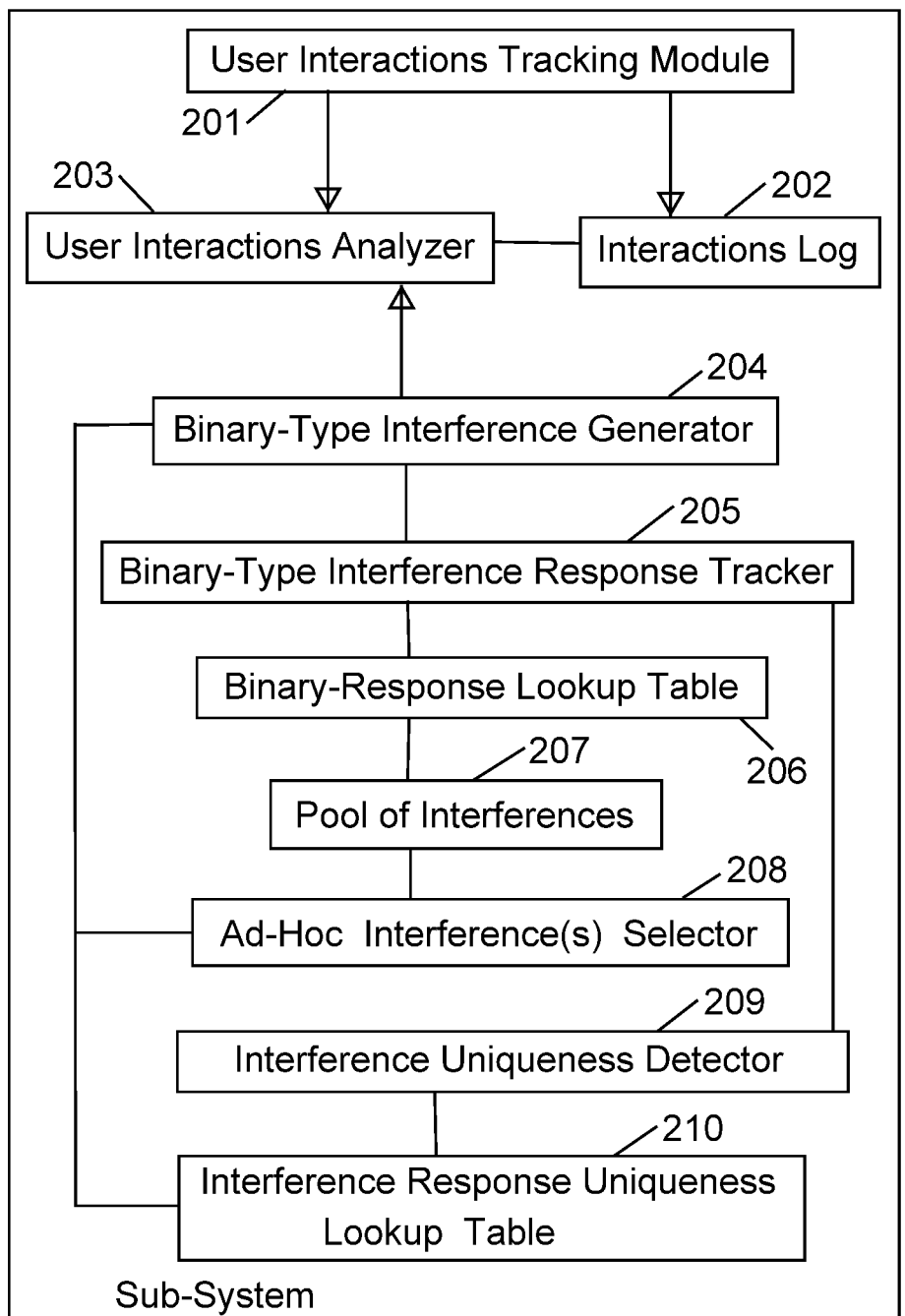
FIG. 2 is a schematic block-diagram illustration of a fraud detection sub-system, in accordance with some demonstrative embodiments of the present invention.

Reference is made to FIG. 2, which is a schematic block-diagram illustration of a fraud detection sub-system 200 in accordance with some demonstrative embodiments of the present invention. For example, in some embodiments, sub-system 200 may operate to detect or to estimate, for example: fraud, fraud attempts, fraudulent computerized operations, unauthorized computerized operations, computerized operations that breach or violate a law or a regulation or policy or terms-of-use or an intended use of a service or website or application, or fraudulent activity.

In accordance with some demonstrative embodiments of the present invention, for example, sub-system 200 may further operate to distinguish or differentiate among users (or to detect fraud) by generating a generic interference, or a set of generic interferences; and by tracking and analyzing the user response as reflected in input operations and other user interactions. Sub-system 200 may be implemented as part of, or as a sub-module of, system 180 of FIG. 1A, the fraud detection module 111 of FIG. 1B, the system 100 of FIG. 1B, and/or other suitable systems or modules.

In accordance with some embodiments, sub-system 200 may comprise, for example: a user interactions tracking module 201; a user interactions log 202; a user interactions analyzer 203; a binary-type interference generator 204; a binary-type interference response tracker 205; a binary-responses lookup table 206; a pool of interferences 207; an ad-hoc interference selector 208; an interference uniqueness detector 209; and an interference response uniqueness lookup table 210.

In accordance with some demonstrative embodiments of the present invention, for example, sub-system 200 may comprise a user interactions tracking module 201, which may track the user interactions (e.g., keyboard presses, mouse-clicks, mouse-movements, touch-screen taps, and/or other user gestures) when the user interacts with a computerized service via an electronic device (e.g., desktop computer, laptop computer, tablet, smartphone, or the like). The user interaction tracking module 201 may observe and/or record and/or log all such user interactions, and may optionally store them in an interactions log 202 or other database or repository.

In some embodiments, a user interactions analyzer 203 may review the tracked user interaction, in real time, or substantially in real time (e.g., within one second or within three seconds of the occurrence or completion of an interaction), or at pre-defined time intervals (e.g., every ten seconds, every 60 seconds), or at pre-defined triggering events (e.g., upon clicking of a "submit" button or a "confirm" button of an online form), or in retrospect (e.g., once a day in retrospect for all the daily interactions that reflect transactions that are in a pipeline for review prior to execution; or as part of a post-action audit process or crime investigation process). In accordance with some demonstrative embodiments of the present invention, for example, the user interactions analyzer 203 may look for a particular user interaction, or for a set or sequence or group or batch of consecutive user interactions, or for a set or sequence or group or batch of non-consecutive user interactions, that are pre-defined in the system as indicative of possible fraud activity (or alternatively, as pre-defined in the system as indicative of legitimate non-fraudulent activity).

In accordance with some demonstrative embodiments of the present invention, a binary-type interference generator 204 may generate an interference or abnormality or anomaly or irregularity, which may be reflected on-screen and/or on an output unit (e.g., screen or touch-screen), and/or may be exhibited by a combination of input unit (mouse, pointer) and output unit (screen, touch-screen). In a demonstrative implementation, the binary-type interference generator may generate an interference that is defined as having two possible user responses. For example, an interference of hiding the mouse-pointer, with possible responses of: (a) the user moving the mouse on a right-left axis to make the disappeared mouse-pointer re-appear; or (b) the user moving the mouse on a down-up axis to make the disappeared mouse-pointer re-appear. As another example, an interference of hiding the mouse-pointer, with possible responses of: (a) the user moving the mouse on an east-west axis to make the disappeared mouse-pointer re-appear; or (b) the user moving the mouse on a north-south axis to make the disappeared mouse-pointer re-appear.

As another demonstrative example, an interference or irregularity of hiding the mouse-pointer (or the on-screen pointer or cursor), may be associated by the system with possible responses of, for example: (a) the user moving the mouse in a clockwise circular manner in order to make the disappeared mouse-pointer re-appear; or (b) the user moving the mouse in an anti-clockwise or counter-clockwise circular manner in order to make the disappeared mouse-pointer re-appear.

As another example, an interference of hiding the mouse-pointer, with possible responses of: (a) the user moving the mouse in a generally-linear manner in order to make the disappeared mouse-pointer re-appear; or (b) the user moving the mouse in a generally-circular manner (or in a non-linear manner) in order to make the disappeared mouse-pointer re-appear.

In accordance with some demonstrative embodiments of the present invention, a binary-type interference response tracker 205 may track the user interactions in response to the introduced input/output interference or irregularity or aberration or other intentional anomaly; and may populate or update or modify accordingly a user-specific binary-responses lookup table 206, which may be represented using a structure or format similar to the demonstrative example of Table 1, or using other suitable data structures, data formats, storing methods, or other rule-based engine or table:

TABLE 1

| Binary-type Interference and Two Possible Responses | The Current User's Response to the Interference | Frequency of this User's Response in the General Population | Is this Binary-type Interference Suitable for further utilization with this User? |
|---|---|---|---|
| Hide mouse-pointer; Response A = circular motion; Response B = linear motion | Response A (Linear motion) | 8% | Yes (because Response A is relatively rare in the population) |
| Hide mouse-pointer; Response C = right-to-left motion; Response D = down-to-up motion | Response D | 87% | No (because Response B is not rare enough) |
| Make the screen un-responsive for 3 seconds; Response E = user performs mouse motion or mouse-click; Response F = user presses keyboard | Response E | 11% | Yes (because Response A is relatively rare in the population) |

A pool of interferences 207 may store one or more rules or definitions (or code portions, or scripts) that correspond to various possible binary-type generic interferences, and may optionally comprise dozens or even hundreds of such binary-type interferences. An ad-hoc interference(s) selector 208 may select one or more interferences, from the pool of interferences 207, that would be used (individually; or in combination with each other; or in groups or batches; or in consecutive order; or in pseudo-random order) with regard to subsequent utilization of the computerized service by the current user, or with regard to the continuing portion or the remaining portion of the communication session or the usage session.

In a demonstrative example, a log-in screen of the computerized service may be used for injecting one or more interferences and for dynamically creating or updating on-the-fly the user-specific binary-responses lookup table 206; and subsequently, when the user is logged-in and attempts to performs a particular transaction (e.g., a wire transfer), only the particular interferences, out of the pool of interferences 207, that were tested and proved to be relatively unique to this particular user, would be injected to this user's interactions with the computerized service. The binary-type interference response tracker 205 may track the current user's responses to the selected-and-injected interferences, in order to determine whether or not the user is a legitimate human user or a cyber-attacker or "bot" or automated script.

In another demonstrative example, a generic interference may be injected and used immediately, in order to differentiate between a human user and a "bot"/automated script; if the user's response is sufficiently unique relative to the general population of users (as defined above); without the need to construct any ad-hoc user profile or long-term user profile; and without the need to re-utilize one or more particular interferences. For example, an Interference Uniqueness detector 209 may operate in conjunction with an Interference Response Uniqueness lookup table 210, in order to determine whether the current user's response to a particular injected interference should be: (i) discarded, and not utilized for determining whether the current user is a human or a "bot"; or (ii) utilized for determining whether the current user is a human or a "bot". The determination may be made based on the level of uniqueness in the general population that is associated with each response of each such interference.

In another demonstrative implementation, the differentiation technique that is based on Generic or Binary-Value Interference may be utilized to detect click-fraud, or an automated script or "bot" or computerized program that automatically clicks on online banners and/or online advertisements and/or other click-able items (or selectable items or objects or elements, such as, "like" button, "follow" button, "fan" button, or the like) for fraudulent purposes or improper purposes (e.g., to increase revenue from advertising; to increase a number of "likes" or "followers" of a page or site, to deflate a marketing budget of a competitor).

For example, a generic interference may be implemented as part of (or near) an online advertisement or banner ad or advertisement link; such that, as part of the process of accessing the banner ad and/or clicking inside it (or, in a particular region inside it), the generic interference may cause an intentional deviation that a human user would have to actively correct (by actively moving the mouse to correct the deviation) and that a "bot" or automatic script may typically not notice and/or may not correct successfully and/or may not correct at all; thereby enabling the system to differentiate between a human user and a banner-clicking "bot" or script, and enabling detection of click-fraud or similar fraud attempts.

Figure 3:
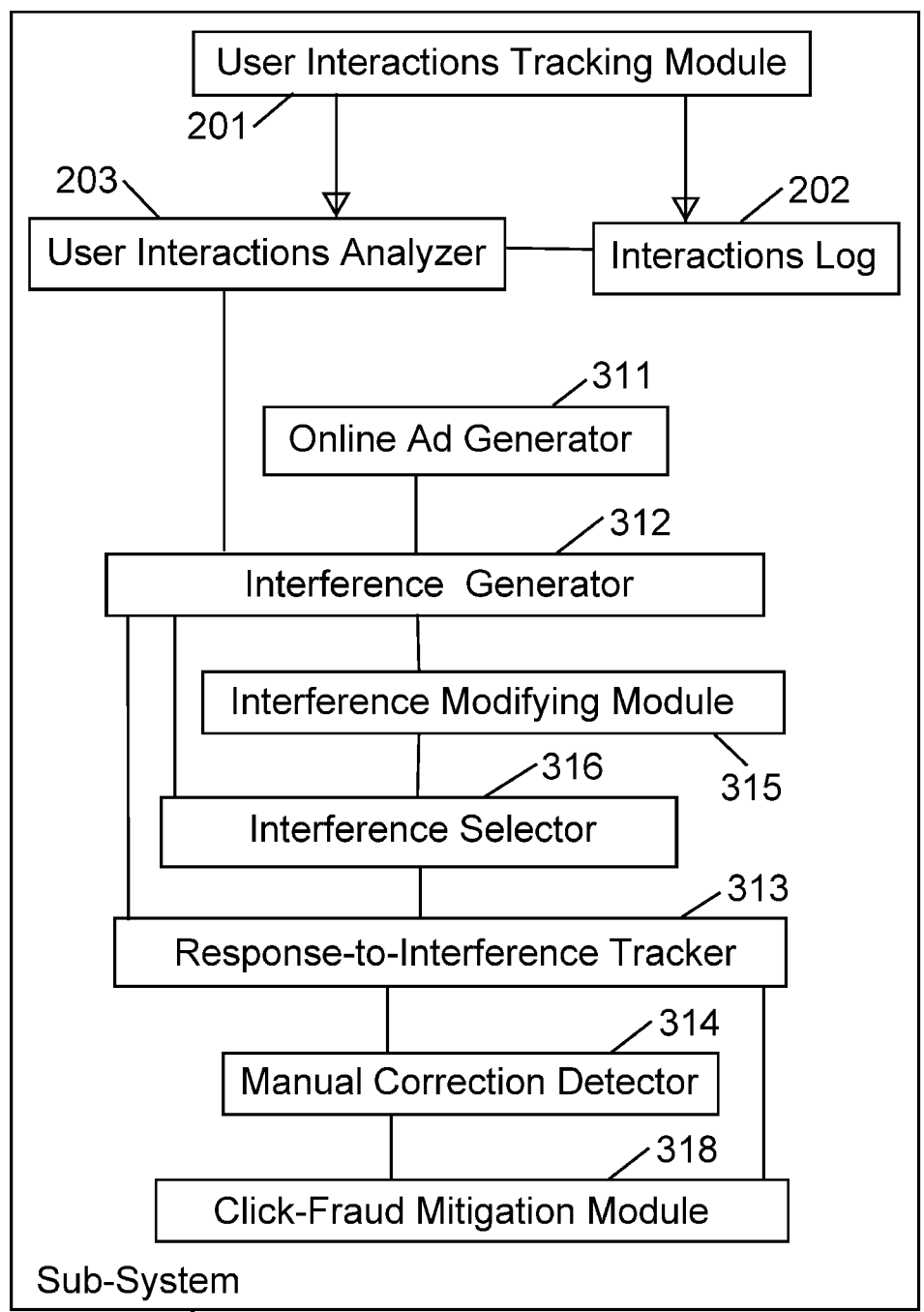
FIG. 3 is a schematic block-diagram illustration of another fraud detection sub-system, in accordance with some demonstrative embodiments of the present invention.

Reference is made to FIG. 3, which is a schematic block-diagram illustration of a fraud detection sub-system 300 in accordance with some demonstrative embodiments of the present invention. Sub-system 300 may be implemented as part of, or as a sub-module of, system 180 of FIG. 1A, the fraud detection module 111 of FIG. 1B, the system 100 of FIG. 1B, and/or other suitable systems or modules.

Sub-system 300 may comprise, for example: a user interactions tracking module 201; a user interactions log 202; a user interactions analyzer 203; an online ad generator 311; an interference generator 312; an interference modifying module 315; an interference selector 316; a response-to-interference tracker 313; a manual-correction detector 314; and a click-fraud mitigation module 318.

Sub-system 300 may comprise a user interactions tracking module 201, which may track the user interactions, and may optionally store them in an interactions log 202 or other database or repository. A user interactions analyzer 203 may review the tracked user interaction, in real time, or substantially in real time, or at pre-defined time intervals, or at pre-defined triggering events, or in retrospect. Sub-system 300 may operate to prevent click-fraud or online-advertising-related fraud.

For example, an online ad generator 311 may generate and/or serve an online ad or banner or sponsored-link or sponsored-content or other engage-able or click-able item or representation. An interference generator 312 may operate in conjunction with (or as part of) the online ad generator 311, and may generate and inject an interference to the user interaction (e.g., input and/or output), while the online ad is displayed, and/or particularly as the user is moving the pointer towards (or near) the displayed online ad. Optionally, a pseudo-random interference modifying module 315 may operate to pseudo-randomly modify one or more parameters that are used by the interference; for example, to pseudo-randomly select an offset distance (e.g., in pixels) of deviating the mouse pointer from its planned route. Optionally, the interference generator 312 may be activated by, or may operate based on a control signal from, an interference selector 316 which may pseudo-randomly select a particular interference to be used for click-fraud prevention, out of a pre-defined pool or bank of interferences.

A response-to-interference tracker 313 may monitor and/or record the user's interactions in response to the injected interference. Specifically, a manual correction detector 314 may examine the user's interactions in order to detect whether or not a correction of the mouse movement (or pointer movement) is exhibited therein (e.g., by monitoring whether or not the mouse interactions reflect a corrective-gesture to correct the on-screen abnormality or anomaly or interference), thereby indicating that a manual correction is being performed by a manual user, and that the click on the displayed online ad is made by a genuine user and not by a "click-bot" or automated script. The manual corrections detector 314 may transfer a signal or an indication to a Click-Fraud mitigation module 318, indicating whether: (a) the current user appears to be a human user, and thus the click on the displayed ad should be counted as a valid click; or (b) the current user appears to be a "bot" or automated script, and thus the click on the displayed ad should not be counted as a valid click (or, should increment a counter of fraudulent clicks).

In some implementations, optionally, the injected interference may have such characteristics such that in the absence of manual correction, the click would not occur within the banner ad itself, but rather would occur outside the banner ad and thus would not be counted at all as a valid click. In other implementation, the injected interference may have such characteristics such that in the absence of manual correction, the click may still occur within the banner ad itself, but would also trigger the fraud detection (due to the lack of manual correction of the interference; for example, by monitoring the mouse movement and determining that no manual correction mouse-gestures are reflected therein) and thus the click would appear to be performed within the banner ad but would not be counted as a valid click.

In another demonstrative implementation, the system may utilize the generic interference method as an "invisible CAPTCHA" mechanism, and may detect a "bot" or automatic script; and may also prevent such "bot" or automatic script from continuing or completing a log-in process or a sign-in process or an attempted or ongoing log-in process. For example, the system may introduce a generic interference in the user interface while the log-in process is being performed (e.g., an intentional mouse deviation while the mouse is on route from the "password" field to the "submit" button). A human user may notice the deviation and may actively correct it (by using the mouse to correct the deviated route); whereas, a "bot" or automated script or program may not detect the generic interference and/or may not correct it (at all, or successfully); and as a result, the "bot" or automated script may generate the mouse-click at an incorrect region, rather than at the correct region (e.g., the "submit" button).

Furthermore, the generic interference may utilize random or pseudo-random parameters, such that even if the attacker that programmed the "bot" may try to learn the deviation pattern and may try to write malicious program code that corrects the deviation, the deviation itself may be random or pseudo-random, and may be different across different usage sessions; thereby blocking an attempt to pre-program a correction method, or blocking an attempt to execute a "pre recorded" mouse movement script, or otherwise causing the "bot" to fail from identifying the required correction, or to causing the "bot" to incorrectly click (e.g., repeatedly, on virtually infinite or a very large number of possible locations).

In a demonstrative example for a generic interference, which may be used as an "invisible CAPTCHA", the system may present a log-in or sign-in page or form (or, other suitable form that may have a Submit or Login button, or similar button or UI or GUI). Once the system detects that the "username" field and the "password" field have been filled (e.g., they contain characters), the system may automatically divide or modify or replace the mouse pointer (or other suitable UI pointer) into two pointers, for example, a "real" mouse pointer (e.g., shaped as a regular arrow or arrow-head), and a "fake" mouse pointer (e.g., shaped as a cross or other suitable object or shape); this may optionally be performed by a suitable client-side or server-side code, such as mouse-pointer replacement code, mouse-pointer modifier code, on-screen-pointer replacement code, on-screen-pointer modifier code, or the like. The "real" mouse pointer may be seen by human users, but may not be detected by a "bot" or automated script or computer program; whereas, the "fake" mouse pointer may be detected (and may be recognized as the "real" pointer) by a "bot" or automated script or computer program. The "fake" mouse pointer may be displayed at an offset distance relative to the "real" mouse pointer; for example, a constant or fixed offset distance, or a dynamically-changing offset distance. The human user may see the "real" mouse pointer, and may aim it (move it) correctly to the "submit" button, and a click or double-click by the human user may thus register correctly. In contrast, the "bot" or automated script may not detect the "real" mouse pointer, and instead may identify and/or may control only the "fake" mouse pointer which has an offset distance from the "real" mouse pointer; and thus, the "bot" or automated script may fail to perform a "click" or a "double-click" at the right on-screen location (e.g., on a "Submit" button), since the "fake" mouse pointer would point to an area external to the right on-screen location or target. An attempt of the "bot" or automated script, to "click" at the regions that the "fake" mouse pointer is pointing to, may not cause a "submit" operation.

In some implementations, the offset distance may be dynamically changed by the fraud-detection module of the system. For example, the "real" mouse pointer (e.g., an arrow or arrow-head) may be replaced with an "invisible" or transparent mouse pointer, and in addition to it, a new, secondary, mouse pointer may be generated and displayed, at a non-fixed offset (a changing offset, a non-linear offset, a dynamically-changing offset) distance relative to the original, transparent, mouse pointer. An automated script or "bot" would control the "transparent" mouse pointer, since the "bot" does not actually see the display on the screen, but rather, only "knows" the computed coordinates of the center of the transparent mouse pointer. In contrast, a human user would not see the transparent mouse pointer; and would see, and would control, the secondary mouse pointer (e.g., controlled by the user, entirely or with a precision approximating the offset distance). In some embodiments, this mechanism may be implemented, for example, using JavaScript or other suitable scripting language or applet, without necessarily requiring installation of a particular software module on the end-user device.

In other implementations, the offset distance of the fake pointer from the real pointer may be constant or fixed. For example, the original mouse pointer may be replaced with a new mouse pointer, comprising a large transparent square; one region or corner of the square may display an arrow or arrow-head of a mouse pointer. The human user would see, and would control and follow, the illustrated mouse pointer that is located at the corner of the transparent square. In contrast, the "bot" or automated script would be indifferent to the content of the "square" mouse pointer, would not see the arrow-head in the corner, and would control a central point in the "square" as if it is the real mouse pointer. This fixed offset may allow a human user to correctly click on a "submit" button, while causing a "bot" or automated script to "miss" a submit button and to click on screen areas that are non-responsive to clicks. In some embodiments, this mechanism may be implemented, for example, using JavaScript or other suitable scripting language or applet, without necessarily requiring installation of a particular software module on the end-user device.

Figure 4:
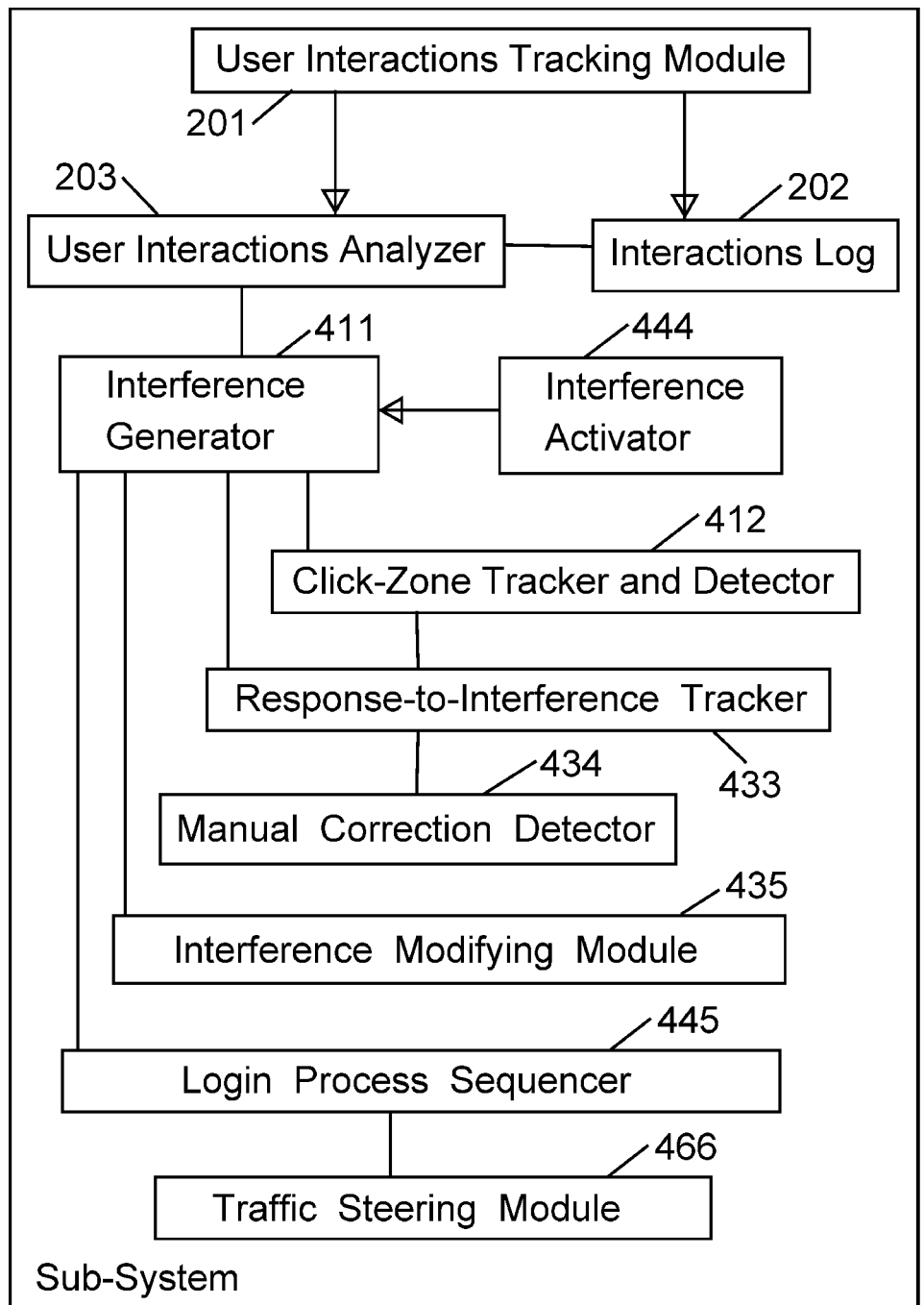
FIG. 4 is a schematic block-diagram illustration of still another fraud detection sub-system, in accordance with some demonstrative embodiments of the present invention.

Reference is made to FIG. 4, which is a schematic block-diagram illustration of a fraud detection sub-system 400 in accordance with some demonstrative embodiments of the present invention. Sub-system 400 may be implemented as part of, or as a sub-module of, system 180 of FIG. 1A, the fraud detection module 111 of FIG. 1B, the system 100 of FIG. 1B, and/or other suitable systems or modules.

Sub-system 400 may comprise, for example: user interactions tracking module 201; interactions log 202; user interactions analyzer 203; an interference generator 411; an interference activator 444; a click-zone tracker and detector 412; a response-to-interference tracker 433; a manual-correction detector 434; an interference modifying module 435; a login process sequencer 445; and a traffic-steering module 466.

Sub-system 400 may comprise user interactions tracking module 201, which may track the user interactions, and may optionally store them in interactions log 202 or other database or repository. User interactions analyzer 203 may review the tracked user interaction, in real time, or substantially in real time, or at pre-defined time intervals, or at pre-defined triggering events, or in retrospect. Sub-system 400 may operate to prevent fraud by implementing an "invisible CAPTCHA" mechanism.

For example, an interference generator 411 may generate and introduce a communication interference or an on-screen interference or an input/output interference (e.g., causing an anomaly or a mismatch between the gestures that the user performs via the input unit such as the mouse, and the output that is produced or displayed via the output unit such as the screen). For example, as the user moves the mouse pointer in order to click on the Submit button, a mouse deviation interference or a mouse hiding interference may be introduced, causing the mouse to deviate away from the submit button and/or causing the mouse to be hidden before it reaches the submit button. An automatic script or "bot" or "replay attacker" may not observe or detect such interference, and may proceed to input a mouse-click as if the mouse-pointer actually reached into the Submit button; and a click-zone tracker and detector 412 may detect that the click was performed outside of the Submit button (e.g., by checking whether the on-screen click was performed within the on-screen Submit button region, or was performed outside of or externally to the on-screen Submit button region); and thus may generate a signal indicating possible fraud. In contrast, a human user may typically notice the on-screen interference, and may actively perform manual correction operations in order to return the mouse-pointer or to move the mouse-pointer into the on-screen Submit button; and the click-zone tracker and detector 413 may detect that the click was performed correctly within the Submit button (and after performance of correction operations by the user), thereby signaling that this is a human user and not a "bot" or automated script or a "replay attack".

Optionally, the click-zone tracker and detector 412 may be implemented in conjunction with (or in association with, or as part of) a response-to-interference tracker 433 which may monitor and/or record the user's interactions in response to the injected interference. Specifically, a manual correction detector 434 may examine the user's interactions in order to detect whether or not a correction of the mouse movement (or pointer movement) is exhibited therein, thereby indicating that a manual correction is being performed by a manual user, and that the click on the Submit button is made by a genuine user and not by a "click-bot" or automated script. The manual corrections Optionally, a pseudo-random interference modifying module 435 may operate to pseudo-randomly modify one or more parameters that are used by the interference; for example, to pseudo-randomly select an offset distance (e.g., in pixels) of deviating the mouse pointer from its planned route to the Submit (or "login", or "sign in") button.

In some embodiments, the interference generator 411 may be activated or triggered to generate an interference at the log-in screen, in a selective manner controlled by an interference activator 444, which may determine to activate the interference based on one or more conditions. For example, if the computerized service detects other fraud signals, or an increased traffic, or an increased rate or number of incorrect logins within a short time period, then the interference activator 444 may estimate that the computerized service is currently undergoing an Application DDOS attack or a brute-force hacking attack, and may thus activate or trigger the interference generator 411 to introduce the "invisible CAPTCHA" interference to the log-in screen.

In some implementations, a login-process sequencer 445 (or similarly, a New Account Creation sequencer module) may be used in order to determine in which page(s) or portion(s) or re-tries of login, should the interference be introduced as part of the login process (or similarly, of a New Account Creation process). For example, the login-process sequencer 445 may determine that it is not necessary to annoy all the users who attempt to login to the system; but rather, that only users who failed a first attempt (or, a first and also second attempt) of logging-in to the service, would be exposed to the on-screen interference during their next or subsequent login attempt(s).

Some embodiments may detect, prevent, reduce and/or eliminate Application DoS attacks. Some computing systems, banking systems, and online commerce systems may already be equipped to handle a Distributed DOS (DDOS) attack, in which a distributed network of "bot" computers ("bots", or "bot-net") may concurrently access a particular website or web-page in order to overwhelm the web server with numerous concurrent requests. Such DDOS attacks are typically attacking infrastructure, for example, load balancers, routers, firewalls, DNS, or application servers.

However, Applicants have realized that hackers or "hacktivists" or other attackers may utilize a bot-net (a network of "bot" computers), which may utilize automatic script(s) in order to impersonate a multitude of human users attempting to access their online accounts within a short time-period. For example, a network of "bot" computers may be programmed (via malware) to perform numerous attempts of erroneous logins, locking the account(s) and thereby blocking legitimate users from accessing the computerized service and forcing them to perform a password-reset process (which may be a time-consuming and/or effort-consuming process, sometimes requiring the legitimate user to place a telephone call to a customer service representative and/or to correctly answer a series of personal questions or security questions). The "bots" may transmit login transactions by synthesizing network traffic (HTTP requests), without human user intervention.

The present invention may detect bot computers that perform operations by transmitting mouse/keyboard commands (e.g., "replay attack"); and may differentiate between (a) interactions performed by real-life human users, and (b) simulated or emulated interactions that are performed by a "bot" computer or automated script. The differentiation may be achieved, for example, by intentionally introducing a generic interference or aberration or anomaly (e.g., generic, not learned as part of a profile of a particular user), such that the feedback or response or reaction to such interference would require the user to discover the interference and to actively determine and perform an appropriate manual response or manual feedback. The interference or anomaly or aberration may be introduced on a random or pseudo-random basis, and/or by utilizing random or pseudo-random interference parameters or interference characteristics in order to prevent a pre-programmed response, and to require actual discovery of the interference (as well as discovery of the particular type and magnitude of the interference) as a condition to responding to it. This may allow the system to differentiate a human user from a regular "bot" computer running an automated script, and even from an advanced "bot" computer that would need to apply both an impersonation mechanism to emulate mouse/keyboard commands as well as human responses that are characterized by random or pseudo-random elements whose source is not a computerized function.

Some embodiments may defend against an Application DOS attack, which may even utilize attack tools able to simulate or emulate an interactive "dialog" between the server and the "user" (e.g., using automated scripts). Furthermore, some embodiments may even defend against an Application DOS attack in which the attacker has knowledge of usernames and corresponding passwords; for example, by differentiating between human user and automated script or "bot", and by incorporating a Web Applications Firewall that may authorize a human user to access the online service, while routing or directing suspected "bots" to a different route for further authentication (e.g., by presenting a CAPTCHA challenge, by requiring two-factor authentication, or the like). The system may utilize a module for detecting automated scripts that do not depend on identification of mouse/keyboard controls; and/or a module for detecting automated scripts that simulate or emulate user interactions with a service.

In some embodiments, for example, sub-system 400 may comprise a traffic steering module 466 which may operate in conjunction with the above-mentioned modules. For example, by generating and introducing an on-screen interference or anomaly, the computerized service may estimate that a current user is actually a "bot" or automated script; and the traffic steering module 466 may steer further communications or traffic or packets from that user, to a separate system or firewall or Web Applications Firewall or to other fraud-mitigation/fraud-detection mechanism, such as, to a secondary server, an offloading server, a load-balancer or router or switch or hub, a traditional CAPTCHA mechanism, a mechanism requiring the user to perform two-factor authentication or two-step authentication, or the like.

Some embodiments may differentiate between: (a) login attempts, or a multitude of login attempts, that are performed by human user(s); and (b) similar login attempts that are performed by automated scripts or "bots", for example, utilizing "replay attacks" that transmit mouse/keyboard commands (and not by legitimate auto-compete services that some web browsers may provide, or that a human user may utilize, such as RoboForm).

The system may comprise a module for identifying robotic or automated or emulated behavior, performed by a "bot" or automated script, detected based on the interaction characteristics; and a module for identifying robotic or automated interactions with a short time frame (e.g., within 5 or 10 or 15 or 30 seconds). Optionally, anomalies or aberrations or interferences may be introduced, and may be such that a human user would reasonably recognize and/or discover, and may even include on-the-fly modification to the user interface; and may be applied on a random basis, frequently. In some embodiments, an interference (or frequent interferences) in a short-time session may be more noticeable or more annoying to the human user, relative to a longer session; and thus the system may keep the interferences to be minimally annoying or reasonably annoying to the human user.

In some embodiments, the interference or aberration may be selectively activated by the computerized service on as a defensive measure against an ongoing or a suspected Application DDOS attack. For example, if an Application DoS attack is identified or suspected, and the attack includes a brute force attack against passwords which may lock-down numerous user accounts due to erroneous attempts, then interferences or anomalies or aberrations may be introduced only at the second or third login attempt per each username, and not on the first attempt. This may allow legitimate users to rapidly access their accounts; whereas "bots" or scripts that attempt to brute-force into accounts, and fail on a first attempt, would be exposed to the interferences in their second and third and consecutive login attempts.

The detection solutions of the present invention may be integrated in the service or application or website, in order to detect and handle automated Application DoS attacks in real time.

The present invention may differentiate or distinguish between the genuine (human) user, and a robot or a machine-operable module or function (e.g., implemented as a computer virus, a Trojan module, a cyber-weapon, or other malware) which attempts to automatically imitate or emulate or simulate movement of a cursor or other interaction with a touch-screen. For example, false identity created by automated malware may be detected by the present invention as such automated malware may lack the characterization of human (e.g., the manual activity having the particular user-specific traits, as described above).

The present invention may operate and may provide an efficient biometric or user-authentication modality, without capturing, storing, or otherwise identifying any Personally Identifiable Information (PII). For example, the present invention may be used to distinguish between a genuine user and a fraudster, without knowing any PPI of the genuine user and/or of the fraudster.

The present invention may detect correlations and extract user-specific traits based on passive data collection and/or based on active challenges. In passive data collection, the device may detect that the user is performing a particular operation (e.g., a vertical scroll gesture), and may further detect that performing this gesture affects in a user-specific way the acceleration and/or the orientation/rotation of the mobile device. In an active challenge, the device (or an application or process thereof) may actively present a challenge to the user, such as, a requirement to the user to perform horizontal scrolling, in order to capture data and detect user-specific correlation(s). The active challenge may be hidden or may be unknown to the user, for example, implemented by creating a Graphical User Interface (GUI) that requires the button to scroll in order to reach a "submit" button or a "next" button or a "continue" button, thereby "forcing" the user to unknowingly perform a particular user-gesture which may be useful for correlation detection or for extraction of user-specific traits, as described. Alternatively, the active challenge may be known to the user, and may be presented to the user as an additional security feature; for example, by requesting the user to drag and drop an on-screen object from a first point to a second point, as an action that may be taken into account for confirming user identity.

Some embodiments of the present invention may be implemented, for example, as a built-in or integrated security feature which may be a component or a module of a system or device, or may be a downloadable or install-able application or module, or plug-in or extension; or as a module of a web-site or web-page, or of a client-server system or a "cloud computing" system; or as machine-readable medium or article or memory unit able to store instructions and/or code which, when executed by the mobile device or by other suitable machine (e.g., a remote server, or a processor or a computer) cause such machine to perform the method(s) and/or operations described herein. Some units, components or modules, may be implemented externally to the user device, may be implemented in a remote server, a web server, a website or webpage, a "cloud computing" server or database, a client/server system, a distributed system, a peer-to-peer network or system, or the like.

The present invention may be used in conjunction with various suitable devices and systems, for example, various devices that have a touch-screen; an ATM; a kiosk machine or vending machine that has a touch-screen; a touch-keyboard; a system that utilizes Augmented Reality (AR) components or AR glasses (e.g., Google Glass®); a device or system that may detect hovering gestures that do not necessarily touch on the screen or touch-screen; a hovering screen; a system or device that utilize brainwave analysis or brainwave control in which the user's brainwaves are captured or read and the user's brain may directly control an application on the mobile device; and/or other suitable devices or systems.

Some embodiments may generate and utilize a generic of binary-value interference. For example, a method may comprise: determining whether a user, who utilizes a computing device to interact with a computerized service, is either an authorized user or an attacker; wherein the determining comprises: generating a temporary input/output interference that causes an anomaly between (A) input gestures that the user performs via an input unit of said computing device, and (B) output that is displayed on a display unit of said computing device as a result of the input gestures; wherein the temporary input/output interference is a binary-type interference defined to trigger one of two possible manual user responses; wherein the two possible manual user responses comprise: a first possible manual user response that is performed by a majority of a general population of users; and a second possible manual user response that is performed by a minority of the general population of users; based on a level of uniqueness in the general population of users, of a particular response-to-interference that is identified in input-unit interactions of said user, determining whether or not to re-use said interference in subsequent usage sessions of said user.

In some embodiments, the method may comprise: determining whether a user, who utilizes a computing device to interact with a computerized service, is either an authorized user or an attacker; wherein the determining comprises: generating a temporary input/output interference that causes an anomaly between (A) input gestures that the user performs via an input unit of said computing device, and (B) output that is displayed on a display unit of said computing device as a result of the input gestures; wherein the temporary input/output interference is a binary-type interference defined to trigger one of two possible manual user responses; wherein the two possible manual user responses comprise: a first possible manual user response that is performed by a majority of a general population of users; and a second possible manual user response that is performed by a minority of the general population of users; tracking user interactions via said input unit in response to said temporary input/output interference; detecting a manual correction operation that the user performs via said input unit in response to said temporary input/output interference; determining whether said manual correction operation that the user performs via said input unit, matches either the first possible manual user response or the second possible manual user response; if said manual user correction operation that the user performs, matches the first possible manual user response that is performed by majority of the general population of users, then discarding said temporary input/output interference from being re-used in subsequent usage sessions of said user; if said manual user correction operation that the user performs, matches the second possible manual user response that is performed by minority of the general population of users, then updating a user profile to indicate that said temporary input/output interference is to be re-used in subsequent usage sessions of said user.

In some embodiments, generating the temporary input/output interference comprises: temporarily hiding an on-screen pointer at the output unit of said computing device; defining the first possible manual response as linear movement of the input unit by the user; defining the second possible manual response as non-linear movement of the input unit by the user; wherein detecting the manual correction operation of said user comprises: determining whether said user performed a manual correction operation having either linear movement of the input unit or non-linear movement of the input unit.

In some embodiments, generating the temporary input/output interference comprises: temporarily hiding an on-screen pointer at the output unit of said computing device; defining the first possible manual response as linear movement of the input unit by the user; defining the second possible manual response as circular movement of the input unit by the user; wherein detecting the manual correction operation of said user comprises: determining whether said user performed a manual correction operation having either linear movement of the input unit or circular movement of the input unit.

In some embodiments, generating the temporary input/output interference comprises: temporarily hiding an on-screen pointer at the output unit of said computing device; defining the first possible manual response as clockwise rotation movement of the input unit by the user; defining the second possible manual response as counter-clockwise rotation movement of the input unit by the user; wherein detecting the manual correction operation of said user comprises: determining whether said user performed a manual correction operation having either clockwise rotation movement of the input unit or counter-clockwise rotation movement of the input unit.

In some embodiments, generating the temporary input/output interference comprises: temporarily hiding an on-screen pointer at the output unit of said computing device; defining the first possible manual response as movement of the input unit by the user; defining the second possible manual response as clicking a button of the input unit by the user; wherein detecting the manual correction operation of said user comprises: determining whether said user performed a manual correction operation having either movement of the input unit or clicking the button of the input unit.

In some embodiments, the method may comprise: storing a lookup table representing a pool of possible on-screen binary-type interferences; for each one of the possible on-screen interferences, determining the level of uniqueness in the population of users of each one of two possible manual responses to interference; updating said lookup table to indicate the level of uniqueness of each possible manual response to each one of the possible on-screen interferences.

In some embodiments, the method may comprise, with regard to a particular user: injecting into a communication session of said particular user, a batch of interferences selected from said pool of possible on-screen binary-type interferences, wherein the injecting comprises injecting one interference at a time; for each injected interference, detecting the manual correction operation performed by said user, and determining whether said manual correction operation performed by said user is either unique or non-unique relative to the general population of users; updating a user profile to indicate which one or more interferences, out of said pool of possible on-screen binary-type interferences, trigger unique responses from said user and are to be used for user-differentiation purposes in subsequent usage sessions of said user.

In some embodiments, the method may comprise, with regard to a particular user: injecting into a communication session of said particular user, a batch of interferences selected from said pool of possible on-screen binary-type interferences, wherein the injecting comprises injecting one interference at a time; for each injected interference, detecting the manual correction operation performed by said user, and determining whether said manual correction operation performed by said user is either unique or non-unique relative to the general population of users; updating a user profile to indicate that with regard to said particular user, one or more interferences out of said pool of possible on-screen binary-type interferences, trigger non-unique responses from said user and are to be discarded and not to be used for user-differentiation purposes in subsequent usage sessions of said user.

In some embodiments, the method may comprise, with regard to a particular user: dynamically creating a user profile for user differentiation, by discarding from said pool a first binary-type interference to which the manual correction operation of said particular user is frequent with at least 70 percent of the population of users; and by maintaining in said pool a second binary-type interference to which the manual correction operation of said particular user is frequent with at most 30 percent of the population of users.

In some embodiments, the method may comprise, with regard to a particular user: dynamically creating a user profile for user differentiation, by discarding from said pool a first binary-type interference to which the manual correction operation of said particular user is frequent with at least 90 percent of the population of users; and by maintaining in said pool a second binary-type interference to which the manual correction operation of said particular user is frequent with at most 10 percent of the population of users.

In some embodiments, the discarding comprises: if said manual user correction operation that the user performs, matches the first possible manual user response that is performed by at least 90 percent of the general population of users, then discarding said temporary input/output interference from being re-used in subsequent usage sessions of said user.

In some embodiments, the discarding comprises: if said manual user correction operation that the user performs, matches the first possible manual user response that is performed by at least 75 percent of the general population of users, then discarding said temporary input/output interference from being re-used in subsequent usage sessions of said user.

In some embodiments, the updating comprises: if said manual user correction operation that the user performs, matches the second possible manual user response that is performed by at most 15 percent of the general population of users, then updating the user profile to indicate that said temporary input/output interference is to be re-used in subsequent usage sessions of said user.

In some embodiments, the updating comprises: if said manual user correction operation that the user performs, matches the second possible manual user response that is performed by at most 30 percent of the general population of users, then updating the user profile to indicate that said temporary input/output interference is to be re-used in subsequent usage sessions of said user.

In some embodiments, the method may comprise: presenting to said user a screen comprising content and an advertisement; injecting a temporary input/output interference that causes an on-screen pointer, that is on route to click within said advertisement, to deviate from its regular route; tracking user interactions with said input unit in response to said temporary input/output interference; determining that said user performed manual correction operations that adequately fix said temporary input/output interference; determining that a click of said user within said advertisement was performed by a genuine user and not by a click-fraud mechanism.

In some embodiments, the method may comprise: presenting to said user a screen comprising content and an advertisement; injecting a temporary input/output interference that causes an on-screen pointer, that is on route to click within said advertisement, to temporarily disappear; tracking user interactions with said input unit in response to said temporary input/output interference; determining that said user performed manual correction operations that adequately fix said temporary input/output interference; determining that a click of said user within said advertisement was performed by a genuine user and not by a click-fraud mechanism.

In some embodiments, the method may comprise: presenting to said user a screen comprising content and an advertisement; injecting a temporary input/output interference that causes an on-screen pointer, that is on route to click within said advertisement, to appear at a pseudo-random offset relative to a regular non-interfered location of said on-screen pointer; tracking user interactions with said input unit in response to said temporary input/output interference; determining that said user performed manual correction operations that adequately fix said temporary input/output interference; determining that a click of said user within said advertisement was performed by a genuine user and not by a click-fraud mechanism.

In some embodiments, the method may comprise: presenting to said user a screen comprising content and an advertisement; injecting a temporary input/output interference that causes an on-screen pointer, that is on route to click within said advertisement, to deviate from its regular route; tracking user interactions with said input unit in response to said temporary input/output interference; determining that said user did not perform manual correction operations that adequately fix said temporary input/output interference; determining that a click of said user within said advertisement was performed by a click-fraud mechanism.

In some embodiments, the method may comprise: presenting to said user a screen comprising content and an advertisement; injecting a temporary input/output interference that causes an on-screen pointer, that is on route to click within said advertisement, to temporarily disappear; tracking user interactions with said input unit in response to said temporary input/output interference; determining that said user did not perform manual correction operations that adequately fix said temporary input/output interference; determining that a click of said user within said advertisement was performed by a click-fraud mechanism.

In some embodiments, the method may comprise: presenting to said user a screen comprising content and an advertisement; injecting a temporary input/output interference that causes an on-screen pointer, that is on route to click within said advertisement, to appear at a pseudo-random offset relative to a regular non-interfered location of said on-screen pointer; tracking user interactions with said input unit in response to said temporary input/output interference; determining that said user did not perform manual correction operations that adequately fix said temporary input/output interference; determining that a click of said user within said advertisement was performed by a click-fraud mechanism.

In some embodiments, the method may comprise: presenting to said user a screen comprising content and an advertisement; injecting a temporary input/output interference that causes an on-screen pointer to operate irregularly relative to pointer-controlling gestures that are inputted by said user while said user is attempting to move said on-screen pointer towards said advertisement; wherein said temporary input/output interference is exhibited as anomaly between (A) user gestures via the input unit, and (B) on-screen behavior of the on-screen pointer; if it is detected that no correction operations were performed by said user in response to said anomaly, then determining that said user is an attacker.

In some embodiments, the method may comprise: presenting to said user a screen comprising content and an advertisement; injecting a temporary input/output interference that causes an on-screen pointer to operate irregularly relative to pointer-controlling gestures that are inputted by said user while said user is attempting to move said on-screen pointer towards said advertisement; wherein said temporary input/output interference is exhibited as anomaly between (A) user gestures via the input unit, and (B) on-screen behavior of the on-screen pointer; wherein the temporary input/output interference causes the on-screen pointer to reach an on-screen location that is external to said advertisement unless manual correction operations are performed via the input unit in response to said temporary input/output interference.

Some embodiments of the present invention may provide an Invisible CAPTCHA mechanism, as well as Application DDOS prevention. For example, a method may comprise: determining whether a user, who utilizes a computing device to interact with a computerized service, is either an authorized user or an attacker; wherein the determining comprises: modifying a log-in screen of the computerized service to cause said log-in screen to exhibit a temporary input/output interference that causes an anomaly between (A) input gestures that the user performs via an input unit of said computing device, and (B) output that is displayed on a display unit of said computing device; tracking user interactions via said input unit in response to said temporary input/output interference at the log-in screen; if said tracking of user interactions indicates that said user performed a manual correction operation to correct said anomaly, then determining that said user is an authorized user; if said tracking of user interactions indicates that said user did not perform manual correction operations that adequately correct said anomaly, then determining that said user is an attacker.

In some embodiments, the tracking of step (ii) comprises: determining whether or not said user performed any manual correction operations; if it is determined that said user did not perform any manual correction operations, then determining that said user is an attacker.

In some embodiments, the tracking of step (ii) comprises: determining whether or not said user performed any manual correction operations; if it is determined that said user performed manual correction operations, then further determining whether the manual correction operations that the user performed adequately correct said anomaly; and if it is determined that the manual correction operations did not adequately correct said anomaly, then determining that said user is an attacker.

In some embodiments, the tracking of step (ii) comprises: determining whether or not said user performed any manual correction operations; if it is determined that said user performed manual correction operations, then further determining whether the manual correction operations that the user performed adequately correct said anomaly; if it is determined that the manual correction operations did not adequately correct said anomaly, then determining that said user is possibly an authorized user and performing an additional authentication challenge for said user.

In some embodiments, modifying the log-in screen of the computerized service comprises: causing a deviation of an on-screen pointer that is being moved by said user, relative to a regular on-screen route of said on-screen pointer.

In some embodiments, modifying the log-in screen of the computerized service comprises: temporarily hiding an on-screen pointer that is being moved by said user.

In some embodiments, modifying the log-in screen of the computerized service comprises: causing an on-screen pointer that is being moved by said user, to appear in a different on-screen location relative to an intended movement route of said on-screen pointer.

In some embodiments, modifying the log-in screen of the computerized service comprises: defining an account creation process that comprises at least three screens in which said user enters information to create a new account for the computerized service; pseudo-randomly shuffling an order in which said at least three screens are presented to said user during said account creation process of said computerized service.

In some embodiments, modifying the log-in screen of the computerized service comprises: defining an account creation process that comprises at least a first screen, a second screen and a third screen; wherein the first screen of said account creation process is fixed and is always the first screen to be displayed to all users during creation of new accounts; presenting to said user the first, fixed, screen of the account creation process; pseudo-randomly selecting whether to present to said user, during the account creation process and immediately after the first fixed screen, either: (A) the second screen of the account creation process, and then the third screen of the account creation process; or (B) the third screen of the account creation process, and then the second screen of the account creation process.

In some embodiments, modifying the log-in screen of the computerized service comprises: defining an account creation process that comprises at least a first screen, a second screen and a third screen; wherein the first screen of said account creation process is fixed and is always the first screen to be displayed to all users during creation of new accounts; presenting to said user the first, fixed, screen of the account creation process; pseudo-randomly selecting whether to present to said user, after the first fixed screen of the account creation process, either: (A) the second screen of the account creation process, and then the third screen of the account creation process; or (B) the third screen of the account creation process, and then the second screen of the account creation process; if step (B) is pseudo-randomly selected, then: (a) presenting to the user the third screen of the log-in process prior to the second screen of the account creation process; (b) tracking user interactions during with said third screen that is presented instead of said second screen; (c) determining whether or not the user interactions at the third screen reflect a user surprise from a change in an expected order of screens of the account creation process; (d) if the determining of step (c) is positive, then determining that said user is an attacker.

In some embodiments, modifying the log-in screen of the computerized service comprises: defining an account creation process that comprises at least a first screen, a second screen and a third screen; wherein the first screen of said account creation process is fixed and is always the first screen to be displayed to all users during creation of new accounts; presenting to said user the first, fixed, screen of the account creation process; when said user interacts with the first fixed screen of the account creation process, generating said temporary input/output interference that causes anomaly between (A) input gestures that the user performs via the input unit of said computing device, and (B) output that is displayed on the display unit of said computing device; tracking user interactions in response to said temporary input/output interference that is introduced into the first fixed screen; if the user interactions in response to said temporary input/output interference that is introduced into the first fixed screen, indicate that the user did not perform manual correction operations that adequately fix said anomaly, then determining that said user is a possible attacker; if it is determined that said user is a possible attacker, then: pseudo-randomly selecting whether to present to said user, after the first fixed screen of the account creation process, either: (A) the second screen of the account creation process, and then the third screen of the account creation process; or (B) the third screen of the account creation process, and then the second screen of the account creation process.

In some embodiments, modifying the log-in screen of the computerized service comprises: defining an account creation process that comprises at least a first screen, a second screen and a third screen; wherein the first screen of said account creation process is fixed and is always the first screen to be displayed to all users during creation of new accounts; presenting to said user the first, fixed, screen of the account creation process; when said user interacts with the first fixed screen of the account creation process, generating said temporary input/output interference that causes anomaly between (A) input gestures that the user performs via the input unit of said computing device, and (B) output that is displayed on the display unit of said computing device; tracking user interactions in response to said temporary input/output interference that is introduced into the first fixed screen; if the user interactions in response to said temporary input/output interference that is introduced into the first fixed screen, indicate that the user did not perform manual correction operations that adequately fix said anomaly, then determining that said user is a possible attacker; if it is determined in step (e) that said user is a possible attacker, then: pseudo-randomly selecting whether to present to said user, after the first fixed screen of the account creation process, either: (A) the second screen of the account creation process, and then the third screen of the account creation process; or (B) the third screen of the account creation process, and then the second screen of the account creation process; if step (B) is pseudo-randomly selected, then: (a1) presenting to the user the third screen of the log-in process prior to the second screen of the account creation process; (b1) tracking user interactions during with said third screen that is presented instead of said second screen; (c1) determining whether or not the user interactions at the third screen reflect a user surprise from a change in an expected order of screens of the account creation process; (d1) if the determining of step (c1) is positive, then determining that said user is an attacker.

In some embodiments, the method may comprise: detecting that a rate of incorrect log-in attempts to said computerized service, within a pre-defined time period, is greater than a threshold rate; determining that the computerized service is possibly undergoing an Application Distributed Denial-of-Service (Application DDoS) attack; based on said determining, modifying a log-in process to the computerized service by generating said temporary input/output interference, and tracking user interactions in response to said temporary input/output interference.

In some embodiments, the method may comprise: detecting that a rate of incorrect log-in attempts to said computerized service, within a pre-defined time period, is greater than a threshold rate; determining that the computerized service is possibly undergoing an Application Distributed Denial-of-Service (Application DDoS) attack; based on the determination of step (b), modifying a log-in process to the computerized service by generating said temporary input/output interference, and tracking user interactions in response to said temporary input/output interference; determining which Internet packets incoming to the computerized service from a source that does not perform manual correction operations in response to said temporary input/output interference; selectively steering said Internet packets to a fraud mitigation module of said computerized service, while steering other incoming Internet packets to a primary server of said computerized service.

In some embodiments, the method may comprise: detecting that a rate of incorrect log-in attempts to said computerized service, within a pre-defined time period, is greater than a threshold rate; determining that the computerized service is possibly undergoing an Application Distributed Denial-of-Service (Application DDoS) attack; based on the determination of step (b), modifying a log-in process to the computerized service by generating said temporary input/output interference, and tracking user interactions in response to said temporary input/output interference; determining which Internet packets incoming to the computerized service from a source that does not perform manual correction operations in response to said temporary input/output interference; selectively steering said Internet packets to a secondary server of said computerized service, while steering other incoming Internet packets to a primary server of said computerized service.

Modules, elements, systems and/or sub-systems described herein may be implemented by using hardware components and/or software modules; for example, utilizing a processor, a controller, an Integrated Circuit (IC), a logic unit, memory unit, storage unit, input unit, output unit, wireless modem or transceiver, wired modem or transceiver, internal or external power source, database or data repository, Operating System (OS), drivers, software applications, or the like. Some embodiments may utilize client/server architecture, distributed architecture, peer-to-peer architecture, and/or other suitable architectures; as well as one or more wired and/or wireless communication protocols, links and/or networks.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

Functions, operations, components and/or features described herein with reference to one or more embodiments of the present invention, may be combined with, or may be utilized in combination with, one or more other functions, operations, components and/or features described herein with reference to one or more other embodiments of the present invention.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method comprising:
   determining whether a user, who utilizes a computing device to interact with a computerized service, is either an authorized user or an attacker; wherein the determining comprises:
   generating a temporary input/output interference that causes an anomaly between (A) input gestures that the user performs via an input unit of said computing device, and (B) output that is displayed on a display unit of said computing device as a result of the input gestures;
   wherein the temporary input/output interference is a binary-type interference defined to trigger one of two possible manual user responses,
   wherein the two possible manual user responses comprise: a first possible manual user response that is performed by a majority of a general population of users; and a second possible manual user response that is performed by a minority of the general population of users;
   based on a level of uniqueness in the general population of users, of a particular response-to-interference that is identified in input-unit interactions of said user, determining whether or not to re-use said temporary input/output interference in subsequent usage sessions of said user;
   wherein the method further comprises:
   presenting to a user of an electronic device a screen comprising content and an advertisement;
   injecting a temporary input/output aberration that causes an on-screen pointer, that is on route to click within said advertisement, to deviate from its regular route;
   tracking user interactions with an input unit of said electronic device in response to said temporary input/output aberration;
   determining whether said user performed manual correction operations that fix said temporary input/output aberration;
   in response to determining that said user performed manual correction operations that fixed said temporary input/output aberration, determining that a click of said user within said advertisement was performed by a genuine user and not by a click-fraud mechanism;
   in response to determining that said user performed manual correction operations that did not fix said temporary input/output aberration, determining that a click of said user within said advertisement was performed by a click-fraud mechanism.

2. The method of claim 1, comprising:
   determining whether a user, who utilizes a computing device to interact with a computerized service, is either an authorized user or an attacker; wherein the determining comprises:
   generating a temporary input/output interference that causes an anomaly between (A) input gestures that the user performs via an input unit of said computing device, and (B) output that is displayed on a display unit of said computing device as a result of the input gestures;
   wherein the temporary input/output interference is a binary-type interference defined to trigger one of two possible manual user responses,
   wherein the two possible manual user responses comprise: a first possible manual user response that is performed by a majority of a general population of users; and a second possible manual user response that is performed by a minority of the general population of users; tracking user interactions via said input unit in response to said temporary input/output interference;
   detecting a manual correction operation that the user performs via said input unit in response to said temporary input/output interference;
   determining whether said manual correction operation that the user performs via said input unit, matches either the first possible manual user response or the second possible manual user response;
   if said manual user correction operation that the user performs, matches the first possible manual user response that is performed by majority of the general population of users, then discarding said temporary input/output interference from being re-used in subsequent usage sessions of said user;
   if said manual user correction operation that the user performs, matches the second possible manual user response that is performed by minority of the general population of users, then updating a user profile to indicate that said temporary input/output interference is to be re-used in subsequent usage sessions of said user.

3. The method of claim 2, wherein the discarding comprises:

if said manual user correction operation that the user performs, matches the first possible manual user response that is performed by at least 90 percent of the general population of users, then discarding said temporary input/output interference from being re-used in subsequent usage sessions of said user.

4. The method of claim 2, wherein the discarding comprises:
if said manual user correction operation that the user performs, matches the first possible manual user response that is performed by at least 75 percent of the general population of users, then discarding said temporary input/output interference from being re-used in subsequent usage sessions of said user.

5. The method of claim 2, wherein the updating comprises:
if said manual user correction operation that the user performs, matches the second possible manual user response that is performed by at most 15 percent of the general population of users, then updating the user profile to indicate that said temporary input/output interference is to be re-used in subsequent usage sessions of said user.

6. The method of claim 1, wherein generating the temporary input/output interference comprises:
temporarily hiding an on-screen pointer at the output unit of said computing device;
defining the first possible manual response as linear movement of the input unit by the user;
defining the second possible manual response as non-linear movement of the input unit by the user;
wherein detecting the manual correction operation of said user comprises: determining whether said user performed a manual correction operation having either linear movement of the input unit or non-linear movement of the input unit.

7. The method of claim 1, wherein generating the temporary input/output interference comprises:
temporarily hiding an on-screen pointer at the output unit of said computing device;
defining the first possible manual response as linear movement of the input unit by the user;
defining the second possible manual response as circular movement of the input unit by the user;
wherein detecting the manual correction operation of said user comprises: determining whether said user performed a manual correction operation having either linear movement of the input unit or circular movement of the input unit.

8. The method of claim 1, wherein generating the temporary input/output interference comprises:
temporarily hiding an on-screen pointer at the output unit of said computing device;
defining the first possible manual response as clockwise rotation movement of the input unit by the user;
defining the second possible manual response as counter-clockwise rotation movement of the input unit by the user;
wherein detecting the manual correction operation of said user comprises: determining whether said user performed a manual correction operation having either clockwise rotation movement of the input unit or counter-clockwise rotation movement of the input unit.

9. The method of claim 1, wherein generating the temporary input/output interference comprises: temporarily hiding an on-screen pointer at the output unit of said computing device;
defining the first possible manual response as movement of the input unit by the user;
defining the second possible manual response as clicking a button of the input unit by the user;
wherein detecting the manual correction operation of said user comprises: determining whether said user performed a manual correction operation having either movement of the input unit or clicking the button of the input unit.

10. The method of claim 1, comprising:
storing a lookup table representing a pool of possible on-screen binary-type interferences;
for each one of the possible on-screen interferences, determining the level of uniqueness in the population of users of each one of two possible manual responses to interference;
updating said lookup table to indicate the level of uniqueness of each possible manual response to each one of the possible on-screen interferences.

11. The method of claim 10, comprising, with regard to a particular user:
injecting into a communication session of said particular user, a batch of interferences selected from said pool of possible on-screen binary-type interferences,
wherein the injecting comprises injecting one interference at a time;
for each injected interference, detecting the manual correction operation performed by said user, and determining whether said manual correction operation performed by said user is either unique or non-unique relative to the general population of users;
updating a user profile to indicate which one or more interferences, out of said pool of possible on-screen binary-type interferences, trigger unique responses from said user and are to be used for user-differentiation purposes in subsequent usage sessions of said user.

12. The method of claim 10, comprising, with regard to a particular user:
injecting into a communication session of said particular user, a batch of interferences selected from said pool of possible on-screen binary-type interferences,
wherein the injecting comprises injecting one interference at a time;
for each injected interference, detecting the manual correction operation performed by said user, and determining whether said manual correction operation performed by said user is either unique or non-unique relative to the general population of users;
updating a user profile to indicate that with regard to said particular user, one or more interferences out of said pool of possible on-screen binary-type interferences, trigger non-unique responses from said user and are to be discarded and not to be used for user-differentiation purposes in subsequent usage sessions of said user.

13. The method of claim 10, comprising, with regard to a particular user:
dynamically creating a user profile for user differentiation,
by discarding from said pool a first binary-type interference to which the manual correction operation of said particular user is frequent with at least 70 percent of the population of users;
and by maintaining in said pool a second binary-type interference to which the manual correction operation of said particular user is frequent with at most 30 percent of the population of users.

14. The method of claim 10, comprising, with regard to a particular user:

dynamically creating a user profile for user differentiation, by discarding from said pool a first binary-type interference to which the manual correction operation of said particular user is frequent with at least 90 percent of the population of users;
and by maintaining in said pool a second binary-type interference to which the manual correction operation of said particular user is frequent with at most 10 percent of the population of users.

15. The method of claim 1, wherein the updating comprises:
if said manual user correction operation that the user performs, matches the second possible manual user response that is performed by at most 30 percent of the general population of users, then updating the user profile to indicate that said temporary input/output interference is to be re-used in subsequent usage sessions of said user.

16. The method of claim 1,
wherein said temporary input/output aberration causes said on-screen pointer, that is on route to click within said advertisement, to temporarily disappear.

17. The method of claim 1,
wherein said temporary input/output aberration causes said on-screen pointer, that is on route to click within said advertisement, to appear at a pseudo-random offset relative to a regular non-interfered location of said on-screen pointer.

18. The method of claim 1,
wherein said temporary input/output aberration causes said on-screen pointer to operate irregularly relative to pointer-controlling gestures that are inputted by said user while said user is attempting to move said on-screen pointer towards said advertisement.

19. The method of claim 1,
wherein the temporary input/output aberration causes the on-screen pointer to reach an on-screen location that is external to said advertisement unless manual correction operations are performed via the input unit in response to said temporary input/output aberration.

* * * * *